(12) United States Patent
Miller

(10) Patent No.: US 7,143,243 B2
(45) Date of Patent: Nov. 28, 2006

(54) TAG ARRAY ACCESS REDUCTION IN A CACHE MEMORY

(75) Inventor: William V. Miller, Arlington, TX (US)

(73) Assignee: VIA-Cyrix, Inc., Fremont, CA (US)

( * ) Notice: Subject to any disclaimer, the term of this patent is extended or adjusted under 35 U.S.C. 154(b) by 265 days.

(21) Appl. No.: 10/447,930

(22) Filed: May 29, 2003

(65) Prior Publication Data

US 2004/0243764 A1  Dec. 2, 2004

(51) Int. Cl.
*G06F 12/06* (2006.01)
(52) U.S. Cl. .................. 711/138; 711/118; 711/137; 711/144; 711/145
(58) Field of Classification Search .............. 711/118, 711/137–138, 144–145
See application file for complete search history.

(56) References Cited

U.S. PATENT DOCUMENTS

| | | | | |
|---|---|---|---|---|
| 4,980,823 A | * | 12/1990 | Liu .............................. | 711/136 |
| 5,544,342 A | * | 8/1996 | Dean .......................... | 711/119 |
| 5,692,151 A | | 11/1997 | Cheong et al. ............. | 395/467 |
| 5,740,399 A | * | 4/1998 | Mayfield et al. ............ | 711/137 |
| 5,761,706 A | * | 6/1998 | Kessler et al. .............. | 711/118 |
| 5,897,654 A | * | 4/1999 | Eisen et al. ................. | 711/131 |
| 6,282,706 B1 | * | 8/2001 | Chauvel et al. ............ | 717/150 |
| 6,449,694 B1 | | 9/2002 | Burgess, Jr. et al. ....... | 711/128 |
| 6,453,390 B1 | | 9/2002 | Aoki et al. ................. | 711/140 |
| 6,470,428 B1 | * | 10/2002 | Milway et al. ............. | 711/138 |
| 6,560,679 B1 | * | 5/2003 | Choi et al. .................. | 711/138 |
| 6,775,741 B1 | * | 8/2004 | Ebeshu et al. ............. | 711/118 |
| 2001/0049772 A1 | * | 12/2001 | Choi et al. .................. | 711/138 |
| 2002/0194430 A1 | * | 12/2002 | Cho .......................... | 711/118 |
| 2003/0056068 A1 | * | 3/2003 | McAllister et al. ......... | 711/156 |
| 2004/0024967 A1 | * | 2/2004 | Zhang ........................ | 711/118 |

\* cited by examiner

*Primary Examiner*—Matthew Kim
*Assistant Examiner*—Hetul Patel
(74) *Attorney, Agent, or Firm*—Preston Gates & Ellis LLP

(57) ABSTRACT

A cache memory is disclosed with reduced tag array searches for sequential memory accesses. The cache memory has components such as at least one tag array, at least one data array associated with the tag array, a tag read control logic module for controlling a tag array search, a comparator associated with the tag array, and a storage module for storing a match result of the comparator while processing a first memory access request that accesses a first data address in a first cacheline of the data array. The stored match result is used for a second memory access request that intends to access a second data address sequential to the first data address, thereby avoiding searching the tag array for the second memory access request.

23 Claims, 4 Drawing Sheets

TAG ARRAY ACCESS REDUCTION IN A CACHE MEMORY

BACKGROUND

The present invention relates generally to computers, and more specifically to reducing power consumption in a cache memory system.

A microprocessor can execute instructions at a very high rate, and it must be connected to a memory system. The memory system is ideally both large and fast, but it is practically impossible to design and make such a system. A composite memory system is designed such that it has both a small and fast cache memory and a large but slow main memory components. In some examples, the access time of a cache may be around ten nanoseconds, while that of the main memory is around 100 nanoseconds.

A cache memory (or simply "cache") is a relatively small and fast storage system incorporated either inside or close to a processor or between a processor and a main system memory. A cache memory stores instructions or data, which can be quickly supplied to the processor. The effectiveness of the cache is largely determined by the spatial locality and temporal locality properties of a program involved. Data from the much larger but slower main memory is automatically staged into the cache by special hardware on a demand basis, typically in units of transfer called "lines" or cachelines (ranging, for example, from 32 to 256 bytes).

When a memory read operation is requested by the processor, the cache memory is checked to determine whether or not the data is present in the cache memory. If the cache contains the referenced data, the cache provides the data to the processor. Otherwise, the data is further accessed from the main memory. As such, the cache can store frequently accessed information and improves the processor performance by delivering the needed information faster than the main memory can. In a typical design, a cache memory uses a data array to store data and a tag array to store the tag addresses corresponding to the data.

A main memory address may consist of a tag field and an index field. The index field is used to index a specific tag address stored in the cache tag array. When a cache memory access is performed, the tag address stored in the cache tag array is read and it is then compared to the tag field of the main memory address. If the two tag addresses match, a cache "hit" has occurred and the corresponding data is read out from the cache to the processor. If the two tag addresses do not match, a cache "miss" has occurred and the requested data is not in the cache, and must be retrieved from other components such as the main memory. If a program running on the computer exhibits good locality of reference, most of the accesses by the processor are satisfied from the cache, and the average memory access time seen by the processor will be very close to that of the cache (e.g., on the order of one to two cycles). Only when the processor does not find the required data in the cache does it incur the "cache miss penalty", which is the longer latency to the main memory.

A typical pipelined cache is a cache, which first performs a cache tag look-up and compare the tag addresses in the tag array and the memory address, and then accesses the appropriate cache data array when the cache tag compare indicates that a hit has taken place. In utilizing the cache memory in modern computer systems, it is highly likely that multiple accesses to the same cache line may be made as the data is retrieved from the cache in a sequential manner. For example, when a processor is doing an instruction fetch, the next instruction to be fetched is often at the next incremental address.

What is needed is an improved method and system for accessing the cache memory so as to reduce the number of cache tag array read operation, thereby reducing the total power consumption.

SUMMARY

A cache memory is disclosed with reduced tag array searches for sequential memory accesses. The cache memory has components such as at least one tag array, at least one data array associated with the tag array, a tag read control logic module for controlling a tag array search, a comparator associated with the tag array, a storage module for storing a match result of the comparator while processing a first memory access request that accesses a first data address in a first cacheline of the data array. The stored match result is used for a second memory access request that intends to access a second data address sequential to the first data address, thereby avoiding searching the tag array for the second memory access request.

DETAILED DESCRIPTION

The present disclosure provides an improved method and system for accessing a tag array of a cache memory utilizing access sequence and direction information so as to minimize the total number of tag array read operations.

Figure 1:
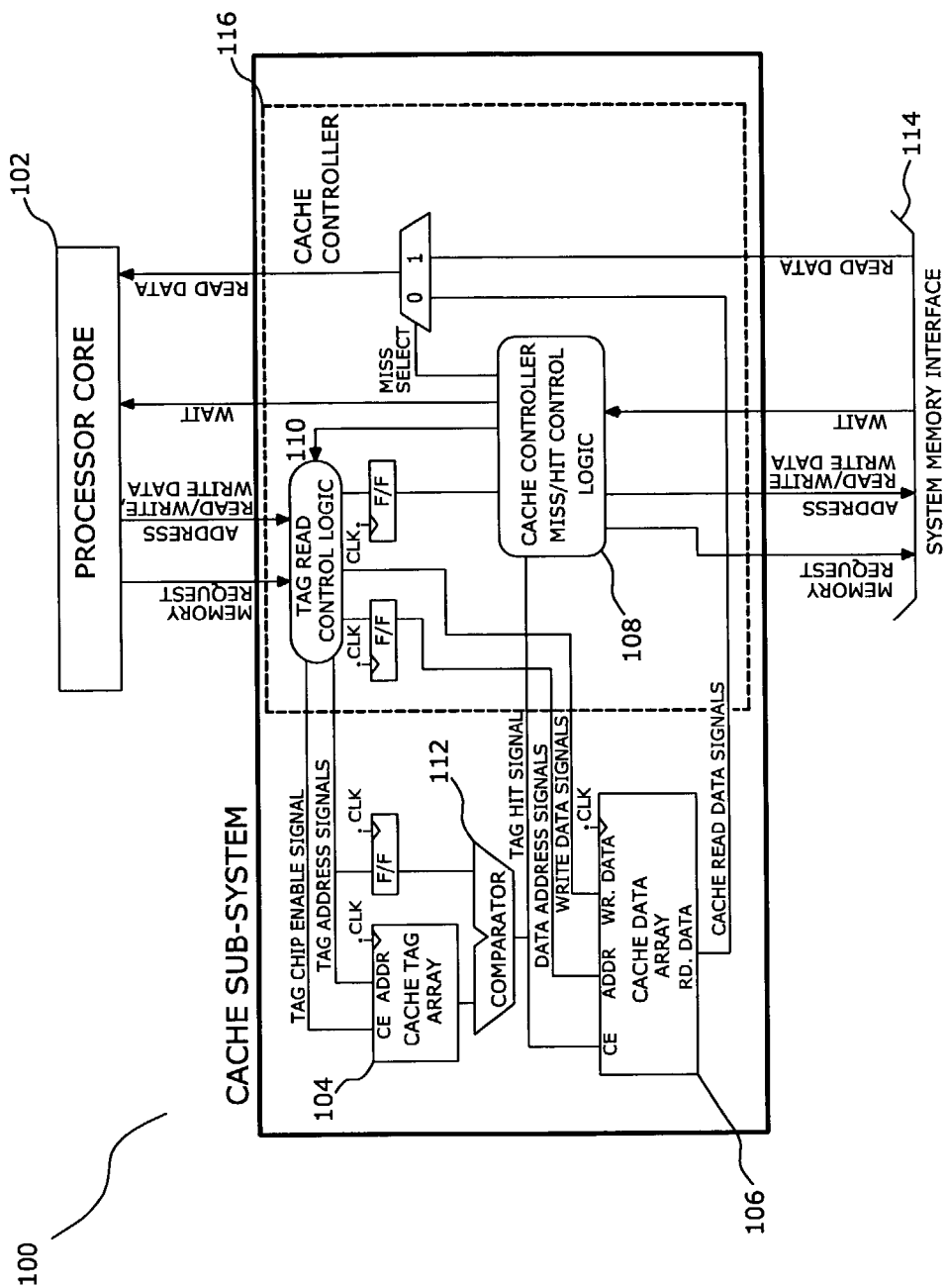
FIG. 1 is a schematic of a pipelined cache memory sub-system

FIG. 1 is a schematic of a pipelined cache memory sub-system (or "cache") 100 that works with a processor 102. The cache has a cache tag array 104 and data array 106. Although only one tag array and one data array is shown, it is understood that multiple tag arrays and multiple data arrays can be implemented as the design requires. Other components include a cache controller miss/hit control logic module 108 and a tag read control logic module 110. In a typical design, there is a comparator 112 that generates a signal indicating whether a hit has been detected. The cache controller miss/hit control logic module 108 and tag read control logic 110 interface with the processor 102 and system memory 114 to carry out all memory reading and writing operations. The tag read control logic module 110, the cache controller miss/hit control logic module 108, and other related components may be referred to as a cache controller 116. Some other standard components are shown in FIG. 1, but are not discussed in specific because they are all well known in the industry that help to complete the functionality of the cache memory sub-system.

The processor 102 will make memory requests to the pipelined cache from time to time. A number of bits in a specified address in a memory request is used as an "index" into the cache. When the cache is enabled by such a memory access request, the cache controller 116 enables the tag array and performs a tag look-up to see whether a tag address identified by the index is the same as a tag entry/address stored in the tag array (e.g., through a compare operation). If a match is found by the comparison, the access to the cache is a cache hit. When the cache hit is found, the cache data array 106 is read in the next clock period. For the read operation, the cache data array 106 provides an entry in the array, such as an appropriate instruction or data, back to the processor 102.

If a mismatch is found by the comparison, the access to the cache is said to be a cache miss. When a cache miss happens, the cache controller will perform a cacheline fill sequence (assuming the memory access is to a cacheable memory range) to cause the requested data to be transferred from the main memory system into the data array.

Figure 2:
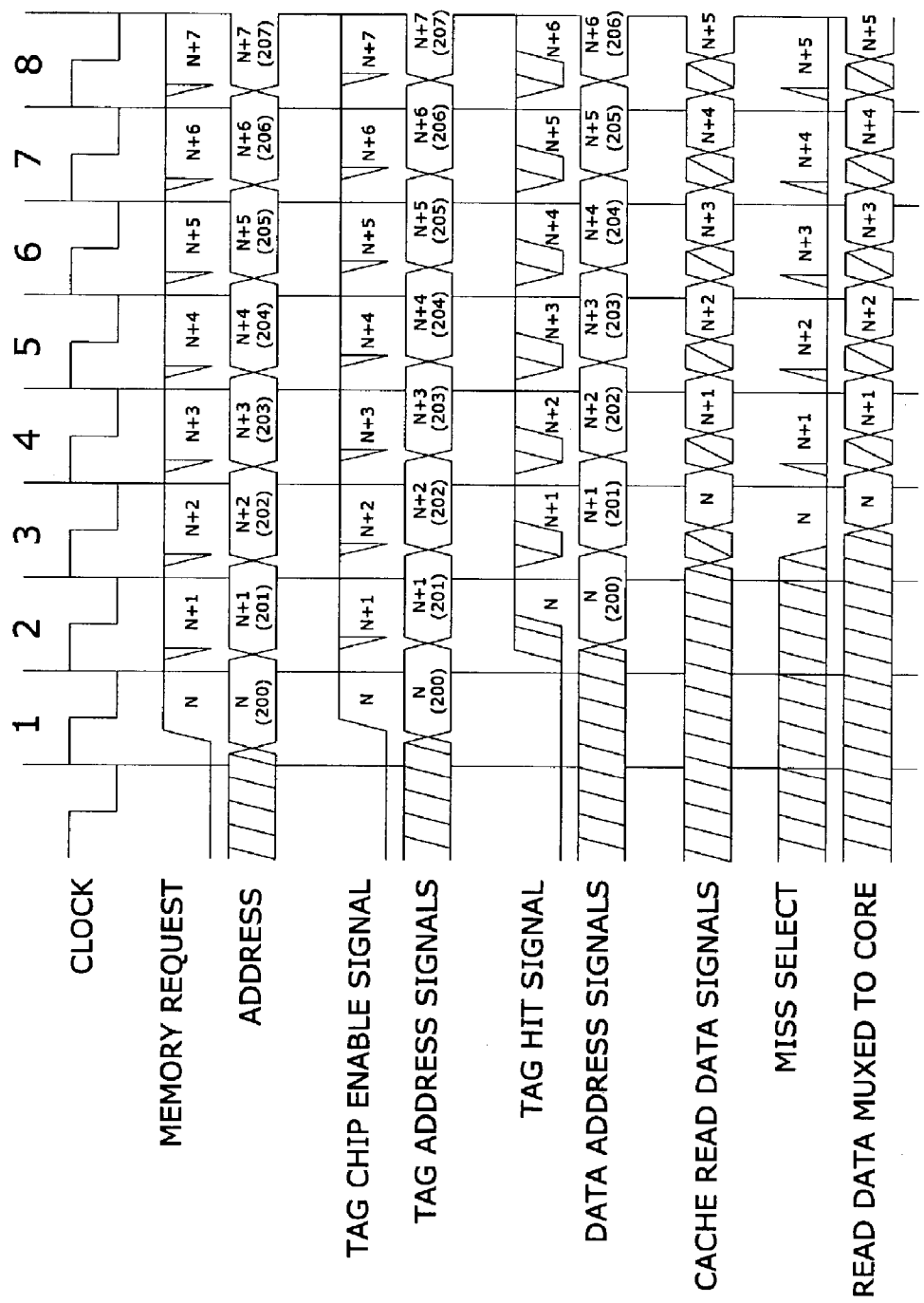
FIG. 2 is a timing diagram of a cache supporting multiple sequential memory accesses.

FIG. 2 is a timing diagram of a cache supporting multiple back-to-back sequential read accesses. In this example, it is assumed that the actual address used by the memory access request of the process is referred to as a core address, and that they are indicted as 200 through 207, as the cache is assumed to be one byte wide. It is understood that the width of each entry in the cache may be of any size, although this example only uses a one-byte wide cache for simplifying the discussion.

The present example presents a scenario in which sequential accesses to the cache occur and every read request of the processor finds a hit in the cache. A sequential access happens when a current memory access finds a data entry in a cacheline of the data array that is located on the same cacheline with another data entry retrieved by a prior memory access. In the best scenario, the two data entries are located next to each other on the cacheline. This scenario actually is found to be more typical in cache read operations. As each data entry is identified by a data address, the two data addresses are said to be sequential as well. Since the cache will get a memory access request from the processor to find the data, the corresponding memory access requests are also said to be sequential memory access requests.

In FIG. 2, it is assumed that there are eight requests for the memory accesses labeled by n through n+7. As illustrated in FIG. 2, as the cache traditionally does not pay attention to the fact that a prior read operation has already found the data in the data array, the tag array will be enabled by a tag chip enable signal and searched during every clock period triggered by every request. Based on the tag array look-up, a Tag Hit Signal is triggered for indicating whether there is a hit in the cache. As stated earlier, in this example, it is assumed that all eight requests find hits, and thus the Tag Hit Signal is on after the first clock cycle. Once the corresponding address of the data array is found (which is indicated by the Data Address Signals), the data is fetched, and the output of the cache is provided to the processor as the line "Read Data Muxed to Core" indicates.

Further examining the timing diagram in FIG. 2, in clock period 1, the processor requests the first memory access request (designated as "n"). In clock period 2, the tag array looks up the tag addresses associated with the memory access request n, which is assumed to be 200, and compares it to the tag array's entries. As assumed, a match is found, so the access is considered to be a hit. The Tag Hit Signal is then generated and may be used as an enable signal for the associated data array. As such, the data array will be read during the next clock period (clock period 3). Moreover, during clock period 2, the processor pipelines the next memory request labeled as (n+1). In clock period 3, the data array is read and provides an appropriate data to be sent back to the processor for the memory access request (n). During the same clock period, the Tag Hit Signal is similarly generated for the memory access (n+1). At the same time, the processor pipelines the next memory access request (n+2). As it is assumed that all memory accesses sequentially issued by the processor will find hits in the cache, the cache activities during clock periods 4,5,6,7 and 8 are all similar to what happens during clock period 3.

As one skilled in the art would appreciate, an entry in a tag array is associated with a cacheline stored in the data array, while each cacheline usually contains multiple sequential data entries. In a typical scenario, the number data entries in each cacheline is four to eight. For the purpose of illustration, it is assumed that the number of data entries in a cacheline is four. As such, the memory addresses 200–203 are all in the same cacheline and there is only one tag entry associated with them. This indicates that of the tag array search of the initial four memory access requests will be the same. Thus, if the results of the tag array search for the memory address 200 are recorded temporarily, they can be used for the subsequent memory requests to access addresses 201, 202 and 203. Therefore, there is no reason to perform the same tag read and compare operation for these subsequent memory accesses. By eliminating three cache tag read and compare operations for accessing four data array entries on a cacheline, the power consumption will be reduced to one-fourth of the conventional implementation.

Figure 3:
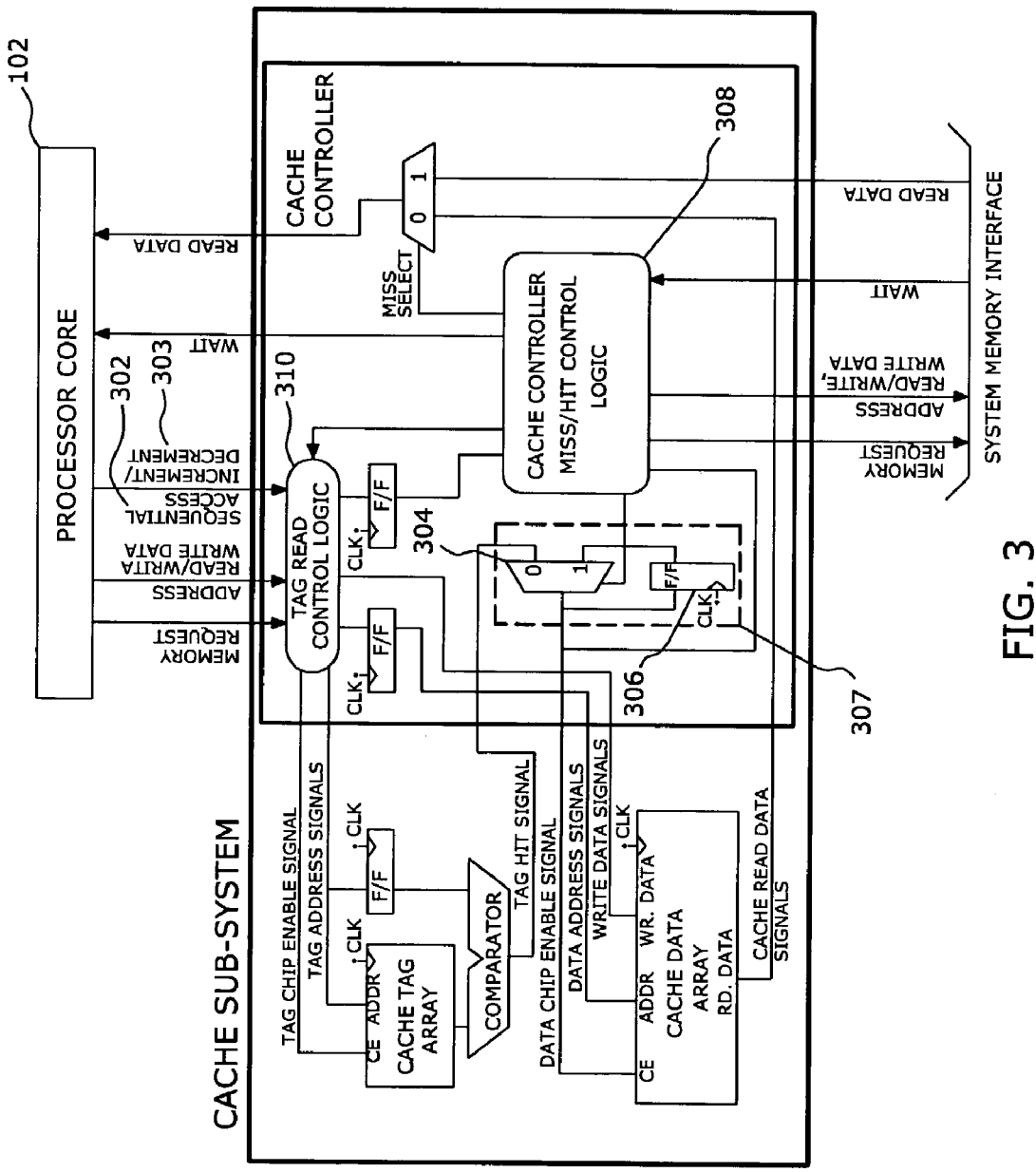
FIG. 3 illustrates a top-level block diagram of an improved cached sub-system according to one example of the present disclosure.

FIG. 3 illustrates a top-level block diagram of an improved cached sub-system according to one example of the present disclosure. First of all, it needs to be determined whether a memory access request is a sequential memory access request. If it is, it would be possible to take advantage of the fact that the same tag array search can be skipped. Therefore, a new predication signal, Sequential Access Signal 302, is formed by the processor 102 to indicate whether the present memory request is sequential to the previous one. This signal will trigger additional circuits integrated in the cache to use the previous tag array search results. For example, when the Sequential Access Signal 302 is active, another signal, Increment/Decrement Signal 303, from the processor 102 will further indicate if the present sequential memory access request is an incrementing or decrementing one, meaning whether the data address is incremented or decremented from the previous one. In the immediate example, memory access request (n+2) is an incrementing one to memory access request (n+1). On the other side, if the current access is (n+2), but the next one is for (n+1), the next one is a decrementing one. These two additional signals can be easily generated by the processor 102 by using its internal logic and processing power.

Another precondition to avoiding multiple tag array searches for sequential memory accesses is that the results from the first tag array search should be somehow stored or passed on to subsequent accesses. A storage mechanism needs to be implemented in the cache so that the tag search results can be used for any sequential memory accesses. In the example shown in FIG. 3, a multiplexer 304 and flip-flop 306 are used to store and enable the Tag Hit Signal to activate the Cache Data Chip Enable Signal for the data array of the cache, as well as storing the signal for the next clock period. The multiplexer and flip-flop pair can be collectively referred to as a tag hit storage logic module 307.

As the data entries in the data array is organized by cachelines, it is helpful to indicate the first entry and the last entry in the same cacheline being accessed. To implement this, the Cache Controller Miss/Hit Control Logic module 308 will indicate to the Tag Read Control Logic module 310 three pieces of information: 1) whether the Tag Hit Storage Logic module contains a valid entry; 2) whether the last access to the cache was to the last data entry of a cacheline; and 3) whether the last access to the cache was to the first data entry of a cacheline. The information about the beginning or the end of the cacheline is important as a following sequential memory access can only be sequential in "one way." In another example of the present disclosure, the exact location of the prior data entry of a cacheline can also be determined and stored so that it can be further determined how many sequential accesses are possible either in the incrementing or decrementing direction for the same cacheline. Tables 1 and 2 below illustrate how the Tag Chip Enable Signal and the next Data Chip Enable Signal are generated in the context of other relevant signals. In these two tables, a numeral "1" indicates an active state, and "0" an inactive state, while an "x" indicates a dormant state with no data provided. "1" may also indicate an "Increment" while "0" is for "Decrement."

As a result of reducing the number of cache tag array search operations while accessing the cache, the cache sub-system can significantly reduce power consumption associated with the cache access operation. Adding a small amount of additional logic to the existing cache circuits is the only cost for integrating such an intelligence feature.

It is further noticed that the examples illustrated above assume a cacheline with the size of four entries, but the cacheline size can vary greatly. As the number of entries in a cacheline increases, the effect of the potential power reduction actually increases.

Further, in the above examples, although a single direct mapped (one-way set associative) cache is used for illustration, caches of any set associativity can easily implement the above described invention. In order to work with multi-way set associated cache, a multiplexer and flip-flop pair may be added for each additional way of cache to be supported.

TABLE 1

| Memory Request | Sequential Access | Increment/ Decrement | Valid Tag Hit Stored Value | Last Cacheline Entry Access | First Cacheline Entry Access | Tag Chip Enable |
|---|---|---|---|---|---|---|
| 0 | X | X | X | X | X | 0 |
| 1 | 0 | X | X | X | X | 1 |
| 1 | X | X | 0 | X | X | 1 |
| 1 | 1 | X | 1 | 0 | 0 | 0 |
| 1 | 1 | 1 | 1 | 0 | X | 0 |
| 1 | 1 | 1 | 1 | 1 | X | 1 |
| 1 | 1 | 0 | 1 | X | 0 | 0 |
| 1 | 1 | 0 | 1 | X | 1 | 1 |

TABLE 2

| Memory Request | Sequential Access | Increment/ Decrement | Valid Tag Hit Stored Value | Last Cacheline Entry Access | First Cacheline Entry Access | Next Data Chip Enable Signal |
|---|---|---|---|---|---|---|
| 0 | X | X | X | X | X | 0 |
| 1 | 0 | X | X | X | X | 0 |
| 1 | X | X | 0 | X | X | 0 |
| 1 | 1 | X | 1 | 0 | 0 | 1 |
| 1 | 1 | 1 | 1 | 0 | X | 1 |
| 1 | 1 | 1 | 1 | 1 | X | 0 |
| 1 | 1 | 0 | 1 | X | 0 | 1 |
| 1 | 1 | 0 | 1 | X | 1 | 0 |

Figure 4:
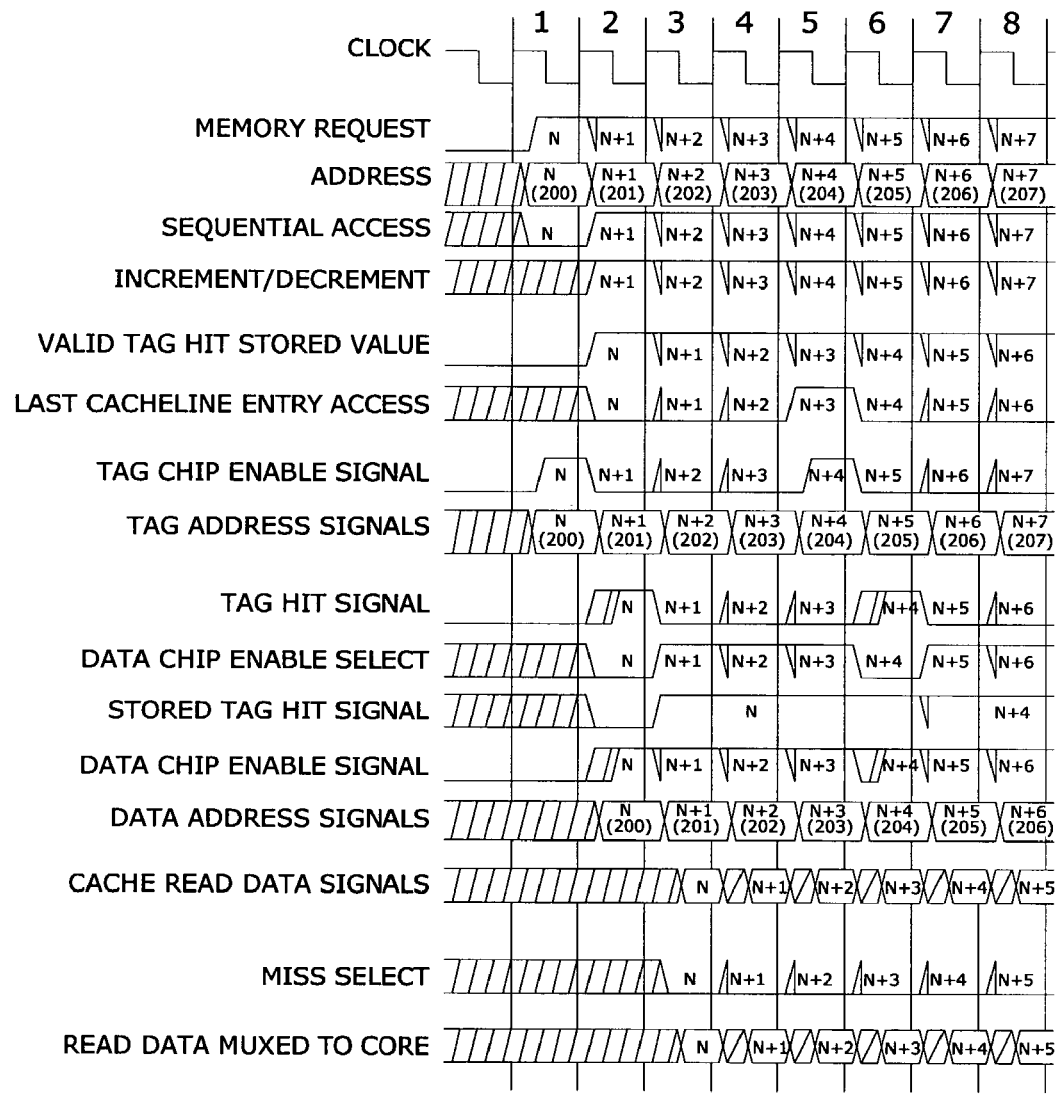
FIG. 4 illustrates a timing diagram for the improved cache sub-system of FIG. 3.

FIG. 4 illustrates a timing diagram for the improved cache supporting multiple sequential memory accesses as disclosed above. Comparing FIG. 4 with FIG. 2, it is noticed that there are additional signals as implemented for the cache operation such as Sequential Access, Increment/Decrement, Valid Tag Hit Stored Value, Last Cacheline Entry Access, Data Chip Enable Select, and Stored Tag Hit Signal.

For FIG. 4, the actual memory addresses used are indicated as 200 through 207, the cache is one byte wide, and a single cacheline holds four data entries. Like FIG. 2, assuming every memory access request hits in the cache, as illustrated by the Tag Chip Enable Signal in FIG. 4, the tag array will only be read on the first access to each cacheline (e.g., memory access requests n and (n+4)), which are the first accesses to two different cachelines. If the cacheline is eight data entries wide, the tag array will be searched once for eight sequential accesses.

In addition, although the above disclosure is illustrated in the context of a cache read operation where a hit is always found for multiple accesses, the same concept can be applied when a miss is found. Once a miss has been found, there is no need to perform any subsequent tag array searches on the particular cacheline identified until the data on that cacheline is filled into the cache from an external source. The above described invention can be improved by considering whether a miss has happened, and Tables 1 and 2 can be modified to make into Tables 3 and 4. To compile the logic for all signals involved, four pieces of information may be provided: 1) whether the tag hit storage logic module contains a valid entry; 2) whether the last access to the cache was a hit or a miss; 3) whether the last access to the cache was to the last data entry of a cacheline; and 4) whether the last access to the cache was to the first data entry of a cacheline. Tables 3 and 4 below illustrate how the Tag Chip Enable signal and the next Data Chip Enable signal are generated along with the changes of other relevant signals. In order to eliminate confusion and distinguish from a mere hit operation, the Tag Hit Stored Value is renamed to be a Tag Stored Value for Table 3, and an additional signal can be generated to indicate whether it is a hit or miss. Moreover, it is the responsibility of the cache controller miss/hit control logic module 308 to properly clear the Valid Tag Stored Value to a zero once a cacheline fill has been successfully completed.

TABLE 3

| Memory Request | Sequential Access | Increment/ Decrement | Valid Tag Stored Value | Last Cacheline Entry Access | First Cacheline Entry Access | Tag Chip Enable |
|---|---|---|---|---|---|---|
| 0 | X | X | X | X | X | 0 |
| 1 | 0 | X | X | X | X | 1 |
| 1 | X | X | 0 | X | X | 1 |
| 1 | 1 | X | 1 | 0 | 0 | 0 |
| 1 | 1 | 1 | 1 | 0 | X | 0 |
| 1 | 1 | 1 | 1 | 1 | X | 1 |
| 1 | 1 | 0 | 1 | X | 0 | 0 |
| 1 | 1 | 0 | 1 | X | 1 | 1 |

TABLE 4

| Memory Request | Sequential Access | Increment (1)/ Decrement (0) | Valid Tag Stored Value | Hit (1)/ Miss(0) | Last Cacheline Entry Access | First Cacheline Entry Access | Next Data Chip Enable Signal |
|---|---|---|---|---|---|---|---|
| 0 | X | X | X | X | X | X | 0 |
| 1 | 0 | X | X | X | X | X | 0 |
| 1 | X | X | 0 | X | X | X | 0 |
| 1 | 1 | X | 1 | 0 | X | X | 0 |
| 1 | 1 | X | 1 | 1 | 0 | 0 | 1 |
| 1 | 1 | 1 | 1 | 1 | 0 | X | 1 |
| 1 | 1 | 1 | 1 | 1 | 1 | X | 0 |
| 1 | 1 | 1 | 1 | 1 | X | 0 | 1 |
| 1 | 1 | 1 | 1 | 1 | X | 1 | 0 |

Furthermore, based on the above description about the read operation, one skilled in the art can appreciate that it is the exact same concept that can be applied to a cache "write" operation by taking advantage of the fact that multiple data entries to be written are located on the same cacheline. When a sequential process is initiated to fill a cacheline in the data array, the tag array searches can be eliminated for finding the data entry location after a first address is obtained. With the Increment/Decrement signal, the data entry can be filled into the cache in either direction after the first data entry is put in the cache.

The above disclosure provides several different embodiments, or examples, for implementing different features of the disclosure. Also, specific examples of components, and processes are described to help clarify the disclosure. These are, of course, merely examples and are not intended to limit the disclosure from that described in the claims.

While the disclosure has been particularly shown and described with reference to the preferred embodiment thereof, it will be understood by those skilled in the art that various changes in form and detail may be made therein without departing from the spirit and scope of the disclosure.

What is claimed is:

1. A method for reducing power consumption of a cache memory by eliminating unnecessary tag array searches for sequential memory accesses, the method comprising:

receiving a first memory access request by the cache memory;

searching the tag array by comparing a tag address associated with the first memory access request with a tag entry stored therein;

recording a match result based on the comparison;

accessing a first data address on a predetermined cacheline in a data array of the cache memory if the match result indicates that the tag address matches with the tag entry; and using the match result for a second memory access request that intends to access a second data address sequential to the first data address in the cacheline, thereby avoiding searching the tag array for the second memory access request, wherein the recording further includes utilizing a multiplexer to generate an output to enable the data array for the second memory access request if it is sequential to the first memory access request.

2. The method of claim 1 further comprising predicting whether the second data address is sequential to the first data address.

3. The method of claim 2 further includes predicting a location of the second data address in the cacheline with respect to the first data address.

4. The method of claim 3 further includes predicting whether the second data address is sequential to the first data address in an incrementing or decrementing way.

5. The method of claim 2 further includes providing a prediction signal to the cache memory.

6. The method of claim 1 wherein the step of using the match result further includes determining whether the first or second data address indicates the beginning of the cacheline.

7. The method of claim 1 wherein the using further includes determining whether the first or second data address indicates the end of the cacheline.

8. The method of claim 1 wherein the recording further includes utilizing a flip-flop to store the match result to be used for the second memory access request.

9. The method of claim 1 wherein the first and second memory access requests are for writing to the cache memory.

10. The method of claim 1 wherein the first and second memory access requests are for reading from the cache memory.

11. The method of claim 1 wherein the match result indicates a hit or a miss in the tag array.

12. The method of claim 1 wherein if the match result indicates a miss in the tag array, ignoring the second cache access request if the second data address is sequential to the first data address in the cacheline.

13. A cache memory with reduced tag array searches for sequential memory accesses, the cache memory comprising:
   at least one tag array;
   at least one data array associated with the tag array;
   a tag read control logic module for controlling a tag array search;
   a comparator associated with the tag array for comparing a tag address associated with a first memory access request with a tag entry stored in the tag array;
   a storage module for storing a match result of the comparator while processing the first memory access request that accesses a first data address in a cacheline of the data array, wherein the match result is used for a second memory access request that intends to access a second data address sequential to the first data address, thereby avoiding searching the tag array for the second memory access request; and
   a multiplexer for generating an output to enable the data array for the second memory access request if it is sequential to the first memory access request.

14. The cache memory of claim 13 wherein the tag read control logic module is associated with a processor which provides a signal indicating whether the second data address is sequential to the first data address.

15. The cache memory of claim 14 wherein the signal further indicates whether the second data address is sequential to the first data address in a decrementing or incrementing way.

16. The cache memory of claim 13 further comprising a cache controller miss/hit control logic module, the module indicating whether the match result in the storage module for the first memory access request is valid to be used for the second memory access request.

17. The cache memory of claim 16 wherein the cache controller miss/hit control logic module further indicates whether the first or second data address is a beginning address in the cacheline.

18. The cache memory of claim 16 wherein the cache controller miss/hit control logic module further indicates whether the first or second data address is the last address in the cacheline.

19. The cache memory of claim 13 wherein the storage module includes a flip-flop and a multiplexer.

20. A method for reducing power consumption of a cache memory by eliminating unnecessary tag array searches for sequential memory accesses for reading data therefrom, the method comprising:
   receiving a first memory access request by the cache memory;
   searching a tag array for the first memory access request to find whether a cache hit is found by comparing a tag address associated with the first memory access request with a tag entry stored in the tag array;
   recording a tag search result based on the comparison;
   accessing a first data address on a cacheline in a data array of the cache memory if a cache hit is found;
   receiving a second memory access request;
   receiving a signal indicating whether the second memory access request intends to access a second data address sequential to the first data address in the cacheline; and
   if the first and second data addresses are sequential, accessing the second data address based on the recorded tag search result,
   wherein the recording further includes utilizing a multiplexer to generate an output to enable the data array for the second memory access request if it is sequential to the first memory access request.

21. The method of claim 20 further comprising predicting a location of the second data address in the cacheline with respect to the first data address.

22. The method of claim 20 further comprising determining whether the first or second data address is located at the beginning or end of the cacheline.

23. The method of claim 20 further comprising if a cache miss is found with regard to the first data address, skipping the second cache access request if the second data address is sequential to the first data address in the cacheline.

* * * * *